United States Patent
Yang

(10) Patent No.: US 6,741,752 B1
(45) Date of Patent: May 25, 2004

(54) METHOD OF REMOVING BLOCK BOUNDARY NOISE COMPONENTS IN BLOCK-CODED IMAGES

(75) Inventor: Jeong-Hun Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/550,728

(22) Filed: Apr. 17, 2000

(30) Foreign Application Priority Data

Apr. 16, 1999 (KR) ........................................ 1999-13549

(51) Int. Cl.[7] ................................................. G06K 9/40
(52) U.S. Cl. ........................ 382/268; 382/197; 382/199; 382/250
(58) Field of Search ................................ 382/268, 250, 382/199, 253, 254, 200; 263/266, 261, 197, 239; 358/426.01–426.16, 1.19; 375/240.03, 240.24; 348/606

(56) References Cited

U.S. PATENT DOCUMENTS

| | | | |
|---|---|---|---|
| 5,337,088 A | | 8/1994 | Honjo |
| 5,590,064 A | | 12/1996 | Astle |
| 5,796,875 A | | 8/1998 | Read |
| 5,960,388 A | * | 9/1999 | Nishiguchi et al. ......... 704/208 |
| 5,978,514 A | * | 11/1999 | Yamaguchi et al. ........ 382/243 |
| 5,982,442 A | * | 11/1999 | Guntzburger .......... 375/240.24 |
| 6,064,954 A | * | 5/2000 | Cohen et al. ................ 704/207 |
| 6,463,100 B1 | * | 10/2002 | Cho et al. .............. 375/240.03 |
| 6,510,407 B1 | * | 1/2003 | Wang ......................... 704/207 |
| 6,614,938 B2 | * | 9/2003 | Yamaguchi et al. ........ 382/239 |

* cited by examiner

Primary Examiner—Timothy M. Johnson
Assistant Examiner—Barry Choobin
(74) Attorney, Agent, or Firm—F. Chau & Associates, LLC

(57) ABSTRACT

An improved block noise elimination method is provided, which uses one-dimensional pixel vectors made of pixel rows or columns across two neighboring blocks to analyze blocky noise residing across the neighboring blocks. The blocky noise in each pixel-vector is modeled as shape vector multiplied by boundary discontinuity. The shape vector, varying with local image activity, is estimated by Minimum Mean Squared Error (MMSE) approach. Depending upon the shape vector, the corresponding blocky noise is eliminated in postprocessing of decoded images so that encoded images may be restored to their original images.

19 Claims, 7 Drawing Sheets

METHOD OF REMOVING BLOCK BOUNDARY NOISE COMPONENTS IN BLOCK-CODED IMAGES

BACKGROUND OF THE INVENTION

1. Field of the Invention

The present invention relates to a method of compressing and decompressing image signals and, more particularly, to a method for restoring block-coded images much closer to their original images.

2. Description of the Related Art

Coding techniques based on Block Discrete Cosine Transform (BDCT) or Vector Quantization (VQ) have been successfully applied to compression of still and moving images.

In BDCT- or VQ-based coding, such as JPEC (Joining Photographic Expert Group) method, an image is segmented into plural non-overlapping blocks each of which contains N pixels horizontally by N pixels vertically (i.e. N×N), as shown in FIG. 1, where N is usually 8.

In BDCT encoding process, original image information of the respective segmented blocks is transformed and compressed into DCT coefficients in accordance with DCT algorithm. The DCT coefficients are quantized, and are encoded in a form suitable for transmission via a channel or storage in a medium. In BDCT decoding process, data received or read from a channel or medium is decoded and dequantized, and undergoes inverse DCT so as to restore its original image.

However, the blockwise operation of the coding algorithm causes undesirable blocky artifacts, which may be visible grey-level discontinuities along block boundaries (refer to FIG. 8a). The blocky artifacts (or interblock grey-level discontinuities) result from visually obvious level difference between blocks when image signals are compressed with DCT or VQ because, during the compression, noises in boundary blocks are greater than those in non-boundary blocks.

Conventional postprocessing techniques to reduce such artifacts are based on the known facts that "blocky noise" (this term refers to 'quantization noise' causing blocky artifacts) is caused by amplified differences between boundary pixel values of neighboring blocks and contains undesirable high frequency components. In other words, most of conventional blocky-artifact-reduction techniques can be classified into two categories: (1) adjustment of block boundary pixels to reduce interblock discontinuities, and (2) lowpass filtering to reduce the high frequency components of the blocky noise.

The first approach is described in, for example, an article by Yang et al., entitled "Regulated reconstruction to reduce blocking effects of block discrete cosine transform compressed images" (IEEE Trans. on Circuits and Systems for Video Technology, vol. 3, pp. 421–432. December 1993). Other examples are founded in articles "Nonlinear constrained least squares estimation to reduce artifacts in block transform-coded images" (M. Crouse et al., Proc. International Conference on Image Processing, pp. 462–465, 1995) and "Blocky artifact reduction using an adaptive constrained least squares method" (J. Yang et al., Electronic Letters, pp. 854–855, vol. 33, no. 10, May 1997). These methods reduce intensity discontinuity across block boundaries, but they often leave visible discontinuities among non-boundary pixels of blocks.

The second approach are disclosed in, for example, articles "Nonlinear space-variant postprocessing of block coded images" (B. Ramamurthi et al, IEEE Trans. on Acoustics, Speech, and Signal Processing, vol. 34, pp. 1258–1267, October 1986), "Iterative procedures for reduction of blocking effects in transform image coding" (R. Rosenholts et al., IEEE Trans. on Circuits and Systems for Video Technology, vol. 2, pp. 91–95, March 1992), "Comments on Iterative procedures for reduction of blocking effects in transform image coding" (S. J. Reeves et al., IEEE Trans. on Circuits and Systems for Video Technology, vol. 3, pp. 439–440. December 1993), and "A POCS(Projection On Convex Set)-based post-processing technique to reduce blocking artifacts in transform coded images" (H. Paek et al, IEEE Trans. Image Processing, vol. 8, no. 3, June 1998). These methods achieve smoothing in a frequency domain by attenuating a specific range of high-frequency components in a transform of a given image, but they tend to blur edges in the original images.

SUMMARY OF THE INVENTION

Accordingly, the present invention is provided to mitigate both the shortcomings stated above.

It is an object of the present invention to provide a method of eliminating interblock noise components in block coded images without deteriorating clearness of the images.

It is another object of the present invention to provide a method of effectively eliminating block noise components in block coded images without discontinuity among non-boundary pixels of blocks.

It is yet another object of the present invention to provide a block noise elimination method to yield clear edges of decoded images.

The foregoing and other objects are achieved as is now described.

A block noise elimination method of the invention uses one-dimensional pixel vectors made of pixel rows or columns across two neighboring blocks to analyze blocky artifacts as noise components residing across the neighboring blocks. Blocky noise in each pixel vector is modeled as shape vector multiplied by boundary discontinuity. The shape vector, varying with local image activities, is estimated by Minimum Mean Squared Error (MMSE) approach. That is, MMSE-based noise estimation is adopted to utilize statistical characteristics of noise components in DCT coded images. For this purpose, blocky artifacts are analyzed as noise components in pixel vectors made of pixel rows and/or columns across the neighboring blocks. The shape vectors, depending upon the local image activities, are estimated by MMSE approach from the statistics of the noise vectors prior to postprocessing. Then, in accordance with the shape vector estimation algorithm of the present invention, boundary discontinuity and local image activity parameter for each pixel vector is calculated and corresponding blocky noise is eliminated.

In accordance with a preferred aspect of the present invention, to eliminate block boundary noise components residing across two neighboring blocks in a block-encoded image such as a BDCT-coded or a VQ-coded image, the block boundary noise components are estimated statistically from encoded pixel vectors of plural various images in an encoding part. The block boundary noise components are estimated using block boundary discontinuity parameters of the pixel vectors and local image activity parameters of the pixel vectors. The block boundary discontinuity parameters are defined as slopes of pixel values across block boundary. The local image activity parameters are defined as nonzero coefficient indices of highest frequency in N-point DCT coefficient vectors of the respective pixel vectors. The estimated noise components are transferred to a decoding part. The estimated block boundary noise components may be transferred to a decoding part together with the encoded pixel vectors in real time. Alternatively, the estimated block boundary noise components are previously stored in a table within a decoding part. The block boundary noise components are denoted by shape vectors representing shapes of the block boundary noises across the adjacent blocks. The shape vectors are one-dimensional vectors corresponding to pixel rows or columns of the adjacent blocks. The shape vectors are estimated with respect to local image activity parameters. The shape vectors are estimated using original pixel vectors of an encode image, encoded pixel vectors and block boundary discontinuity parameters of the encoded pixel vectors.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein.

DETAILED DESCRIPTION OF PREFERRED EMBODIMENTS

The present invention provides an improvement in reducing blocky artifacts of images coded with block DCT (Discrete Cosine Transform). The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Noise Model

Figure 1:
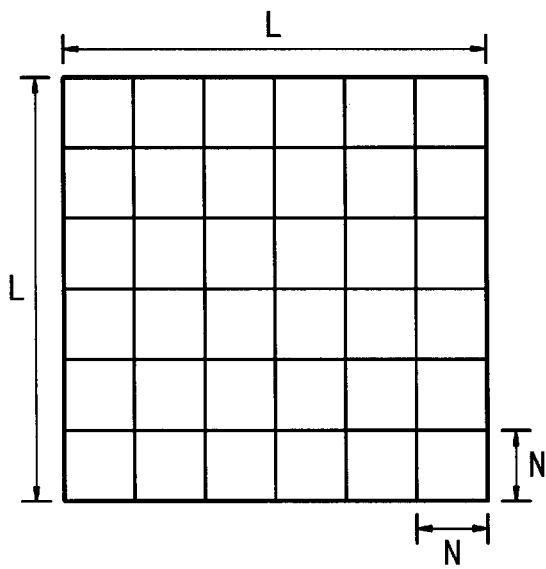
FIG. 1 shows a division of an image for encoding.
Figure 2:
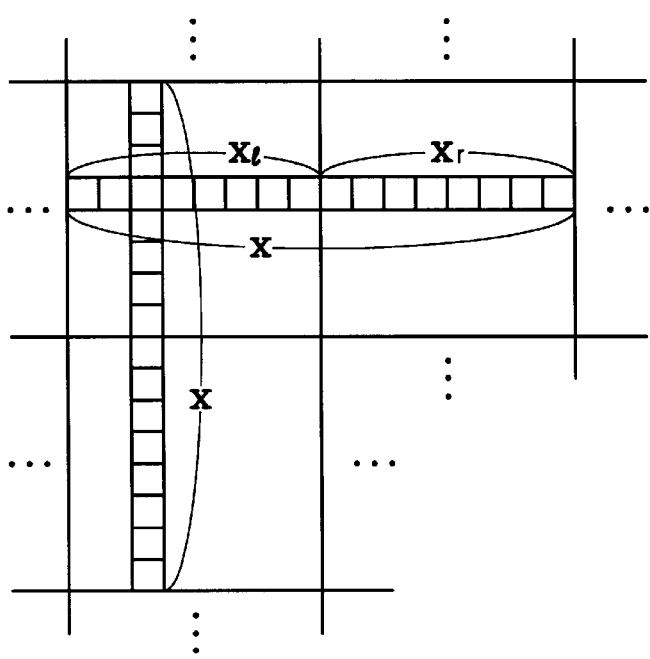
FIG. 2 shows one-dimensional pixel vectors made of pixel rows or columns across two neighboring blocks.

To analyze blocky artifacts as noise components residing across two neighboring blocks, one-dimensional pixel vectors are used as shown in FIG. 2. The pixel vectors are made of pixel rows and columns across the neighboring blocks. Here, for explanation, let $x=(x(0), \ldots, x(N-1), x(N), \ldots, x(2N-1))$ denote a pixel vector when an image is encoded on an N×N block basis, and name $x(N-1)$ and $x(N)$ boundary pixels. In addition, let $x_l=(x(0), \ldots, x(N-1))$ and $x_r=(x(N), \ldots, x(2N-1))$ denote subvectors of x. And $x^o$ is used to denote an original pixel vector.

Figure 3:
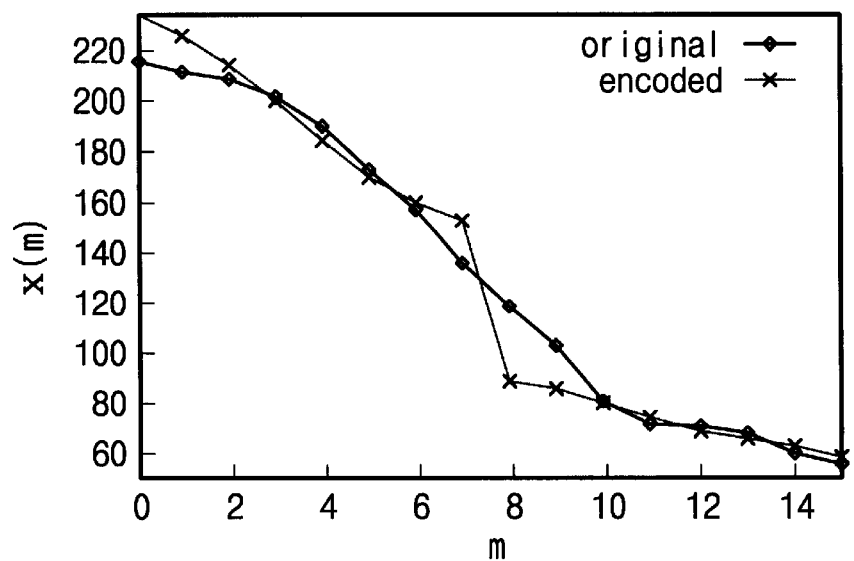
FIG. 3 shows typical pixel values in a vector from an original and its 8×8 DCT encoded version.
Figure 5:
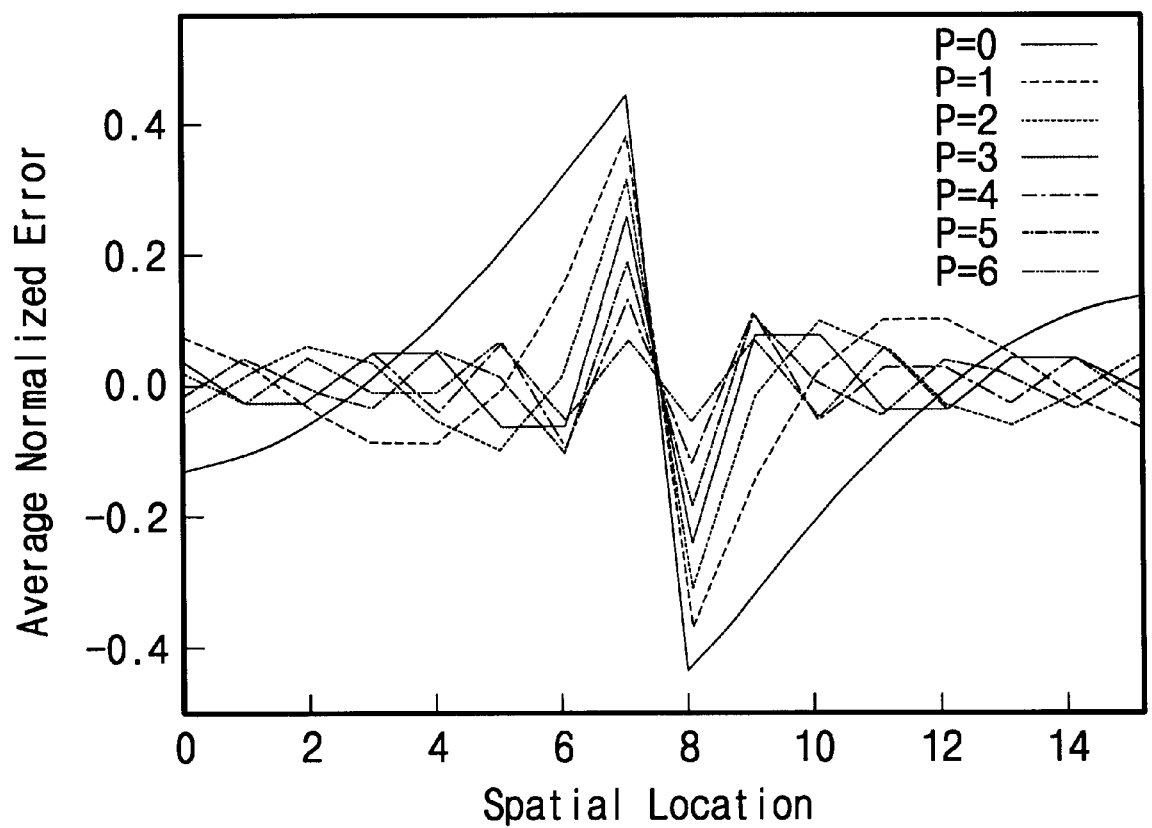
FIG. 5 shows shape vectors calculated from nine images encoded at plural bit rates.

Comparing original and encoded pixel vectors, following two characteristics of blocky noise can be found: one is that an intensity difference between the boundary pixels is highly magnified by blocky noise as shown in FIG. 3, which shows that error is larger at boundary locations and that the error graph appears asymmetric about a center, enlarging the difference between the boundary pixels of an encoded image. The other characteristic is that noise components in each pixel vector appear in different shapes according to local image activities of the pixel vectors as shown in FIG. 5, which shows shape vectors calculated from nine images encoded at plural bit rates.

Figure 4:
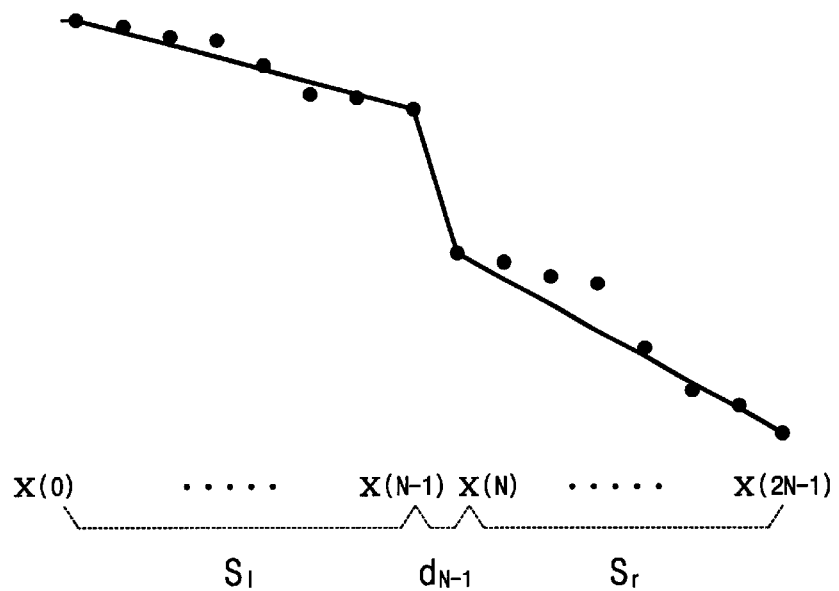
FIG. 4 shows a boundary pixel slope and internal pixel slopes.

First, to consider the intensity difference between boundary pixels, boundary discontinuity D is defined as a steepened slope of pixel values across the block boundary as compared to slopes of internal pixels. Referring to FIG. 4, specifically for a 2N-dimensional vector x, a boundary pixel slope $d_{N-1}$ is $'x(N-1)-x(N)'$ and internal pixel slopes are $'x(m)-x(m+1)'(m=0, \ldots, N-2, N, \ldots, 2N-2)$. Assuming that the slopes of internal pixel values are well preserved during encoding process, the boundary discontinuity can be estimated by the following equation.

$$D = d_{N-1} - \frac{s_l + s_r}{2} \quad (1)$$

where $$s_l = \frac{x(0) - x(N-1)}{N-1} \text{ and } s_r = \frac{x(N) - x(2N-1)}{N-1}$$

represent average internal pixel slopes of $x_l$ and $x_r$, respectively.

The boundary discontinuity D in equation (1) can be used as a measure of blockiness in the respective vectors since encoded vectors with more apparent blockiness show greater D values in experiments.

To analyze blocky noise utilizing the characteristics that noise components in each pixel vector appear in different shape according to local image activities of the pixel vectors, the local image activity in each pixel vector is quantified using DCT coefficients information as follows.

Each quantized N×N DCT coefficient block includes only a few nonzero elements since quantizer eliminates most of high frequency coefficients with small values. Let $X_l$ and $X_r$ be N-point DCT coefficient vectors of $x_l$ and $x_r$, respectively. Also, $X_l$ and $X_r$ have only a few nonzero coefficients. If $P_l$ and $P_r$ are respectively nonzero coefficient indices of the highest frequency in $X_l$ and $X_r$ of an encoded image, then a local image activity for each vector can be represented as a parameter $P=\max(P_l, P_r)$. The parameter P is calculated from the encoded image before postprocessing.

Considering the above-described two noise characteristics in each pixel vector (i.e. boundary discontinuity and shape), an encoded pixel vector x can be given by:

$$x = x^o + D \cdot b_P \quad (2)$$

where $b_P$ is a shape vector which represents a shape of boundary noises when local image activity is P. It is assumed herein that the boundary discontinuity and shape vector are independent of each other.

Here, reduction of blocky noise in an encoded pixel vector x is considered when its boundary discontinuity is D and local image activity parameter is P. Denoting $\hat{b}_P$ as properly estimated vector of $b_P$, the pixel vector $\hat{x}$ with reduced blocky noise is given as follows:

$$\hat{x} = x - D \cdot \hat{b}_P \qquad (3)$$

In this reduction scheme, the mean squared error (MSE) between original vector $x^o$ and postprocessed vector $\hat{x}$ can be formulated using the equation (3) as $$\|\hat{x} - x^o\|^2 = \|(x - x^o) - D \cdot \hat{b}_P\|^2 \qquad (4)$$
$$= \left((x - x^o) - D \cdot \hat{b}_P\right)^t \cdot \left((x - x^o) - D \cdot \hat{b}\right)$$

Then the vector $\hat{b}_P$ minimizing the mean squared error in the equation (4) has to stratify the following.

$$\frac{\partial}{\partial \hat{b}_P} E(\|\hat{x} - x^o\|^2) = E\left(-2D(x - x^o) + 2D^2 \hat{b}_P\right) \qquad (5)$$
$$= 0$$

A derivative of an arbitrary function f(g) with respect to a vector $g = (g_0, g_1, \ldots, g_{2N-1})$ is defined as $$\frac{\partial}{\partial g} f(g) = \begin{bmatrix} \frac{\partial}{\partial g_0} f(g) \\ \frac{\partial}{\partial g_1} f(g) \\ \vdots \\ \frac{\partial}{\partial g_{2N-1}} f(g) \end{bmatrix} \qquad (6)$$

Ignoring correlation between the boundary discontinuity D and the estimated shape vector $\hat{b}_P$ in equation (2), a shape vector minimizing the MSE between the original vector $x^o$ and the postprocessed vector $\hat{x}$, that is, $E(\|x^o - \hat{x}\|^2)$, can be estimated from statistical characteristics of $x^o$ and $\hat{x}$ as follows.

$$\hat{b}_P = E\left(\frac{x - x^o}{D} \bigg| P\right), P = 0, 1, \ldots, N-1 \qquad (7)$$

where $E(\cdot|P)$ denotes conditional expectation for the vectors whose local image activity parameters are P.

FIG. 5 shows that noise vectors appear in different shapes according to the local image activity parameters. In this figure, the horizontal axis (or abscissa) represents spatial locations and the vertical axis (or ordinate) represents average normalized errors of estimated shape vectors. The shape vectors are calculated using nine images encoded in several bit rates by JPEG algorithm (refer to ISO/IEC/JTC1/SC1/WG8, Joining Photographic Expert Group, JPEC technical specification, Revision 8, 1990).

The average normalized errors are functions of 2N-point DCT basis as shown in FIG. 5, they can be pre-calculated and stored. So, given an image with blocky noise, the postprocessing can simply be performed in a spatial domain, significantly reducing the computational complexity involved in 2N-point DCT and inverse DCT. Note that P is determined by N-point DCT coefficients and can be obtained from encoded data without further processing.

A noise estimation of the present invention requires original image information as seen from equation (7). Accordingly, shape vectors can be estimated in the following ways.

In a first case, an encoding part estimates shape vectors using original image information and transfer the estimated shape vectors to a decoding part as overhead information together with encoded image information in real time. So, the decoding part can use the shape vectors in postprocessing of the image information. This method can reflect the characteristics of the blocky noises with small overhead.

In a second case, shape vectors pre-estimated by an encoding part are stored previously in a table within a decoding part. The decoding part performs postprocessing using the stored shape vectors. This method is especially suitable for estimating shape vectors using images encoded in various bit rates since overhead information is not necessary.

Figure 6:
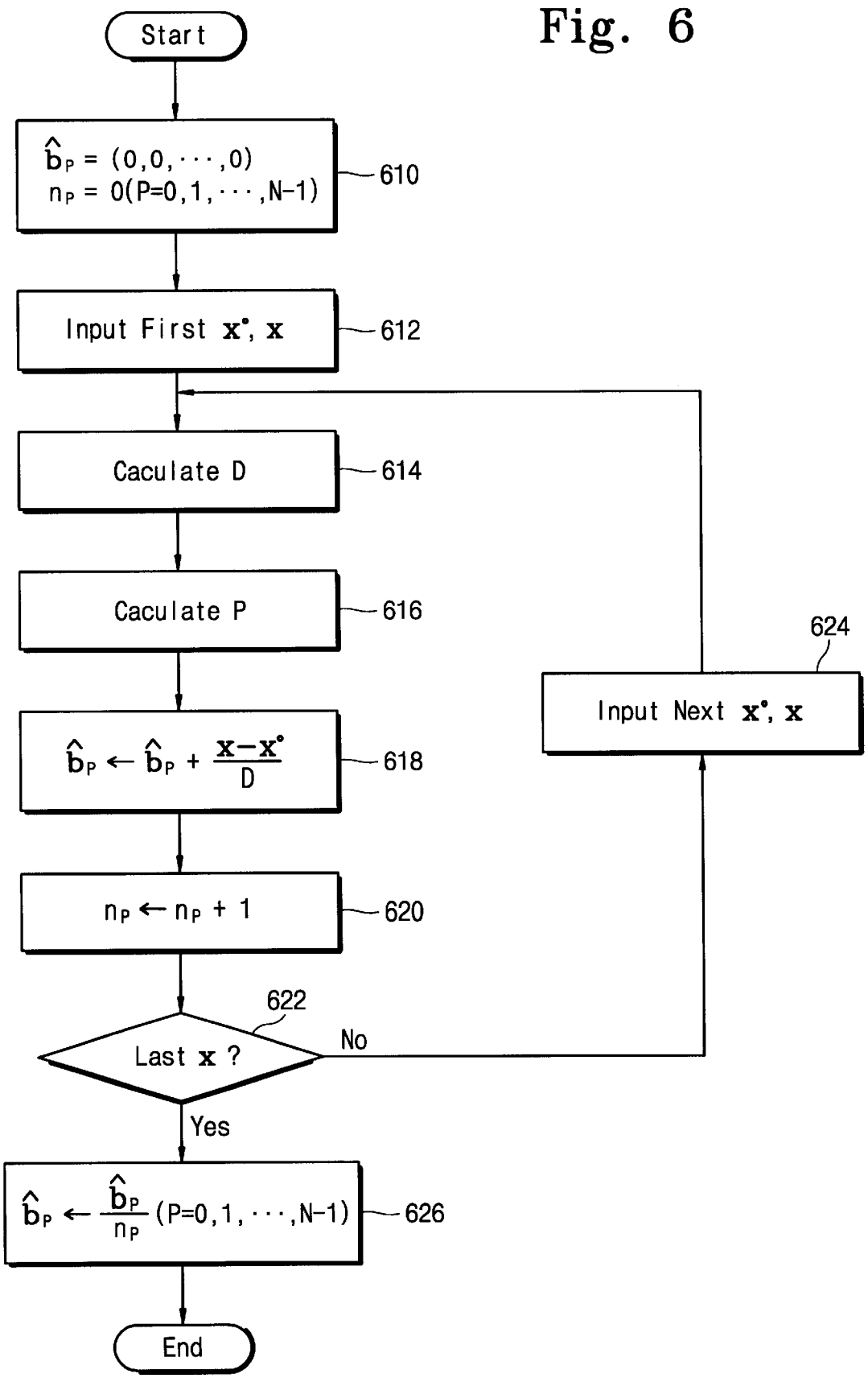
FIG. 6 is a flowchart showing a shape vector estimation method in accordance with the present invention.

FIG. 6 is a flowchart showing a shape vector estimation method according to the present invention. The shape vector estimation can preferably be performed using a digital information processing system such as a personal computer.

Referring to FIG. 6, at step 610, shape vectors $\hat{b}_k$ (k=0, 1, ..., and N-1) corresponding to N pixels respectively on a row or column within each block are set to zero vectors. In addition, N variables $n_P$ (P=0, 1, ..., and N-1) used to represent the number of pixel rows or columns having the same local image activity are set to zero.

At step 612, an original pixel vector $x^o$ and its encoded vector x of first pixel row or column are input, and thereafter flow advances to step 614 wherein boundary discontinuity D of the input pixel vector x is calculated using equation (1).

At step 616, local image activity P of the input pixel vector x is calculated. Specifically, at this step, N-point DCT is performed for subvectors $x_l$ and $x_r$ of the pixel vector x, nonzero coefficient indices $P_l$ and $P_r$ of the respective subvectors $x_l$ and $x_r$ are calculated, and of the two indices $P_l$ and $P_r$, larger one is determined as the local image activity P.

At step 618, shape vectors $\hat{b}$ are conditionally accumulated. That is, shape vectors $\hat{b}_P$ of the local image activity P are calculated. For example, when the local image activity P of a pixel row or column obtained from the input pixel vector x is 0, boundary noise component $(x-x^o)/D$ of the row or column is calculated and the result is added to given shape vector $\hat{b}_0$. When the local image activity P is 1, boundary noise component $(x-x^o)/D$ of the row or column is also calculated and the result is added to given shape vector $\hat{b}_1$.

Thereafter, flow proceeds to step 620, wherein an integer variable $n_P$ corresponding to each local image activity P (P=0, 1, ..., or N-1) calculated from the input pixel vector x is increased. If, for example, the local image activity P is N-1, then $n_{N-1}$ is increased by 1 from its given value.

At step 622, it is determined whether the input pixel vector x is the last vector of plural (e.g., approximately 10) given images. If not, flow proceeds to step 624 wherein the next vectors $x^o$ and x are input, and then returns to step 614. If so at step 622, flow advances to step 626.

At step 626, average values of shape vectors $\hat{b}_P$ with respect to the respective local activities P (P=0, 1, ..., and N-1) are calculated. That is, each shape vector $\hat{b}_P$ of the respective local image activity P (P=1, 2, ..., or N-1) is divided by the corresponding variable $n_P$ (P=0, 1, ..., or N-1) and the result becomes a final shape vector $\hat{b}_P$ (P=0, 1, ..., or N-1).

The above-described shape vectors may be estimated in an encoding part and transferred to a decoding part as overhead information, or be pre-estimated statistically and stored in a table within a decoding part.

Postprocessing of Decoded Image Information

Figure 7:
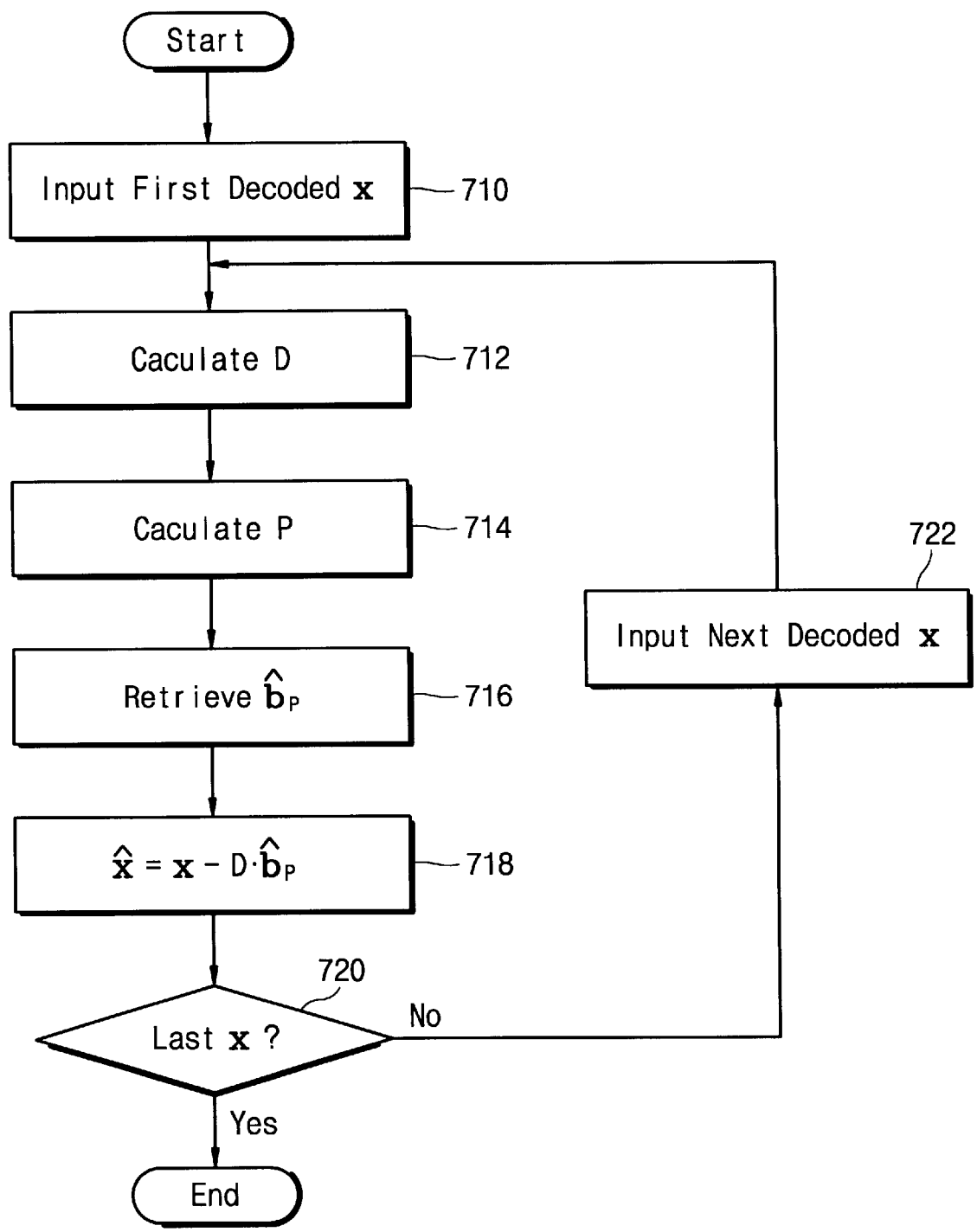
FIG. 7 is a flowchart showing a postprocessing method in accordance with the present invention.

FIG. 7 is a flowchart showing a postprocessing method according to the present invention. This method is applied to image data decoded with inverse DCT in a decoding part.

Referring to FIG. 7, the postprocessing method begins at step 710 wherein a first decoded pixel vector x is input. Next, at step 712, boundary discontinuity D of the input vector x is calculated, and then local image activity P of the input vector x is calculated at step 714. The parameter P is obtained in the same manner as in the above-described shape vector estimation. Thus, the explanation therefor will be omitted to avoid duplicate description.

At step 716, the decoding part receives shape vector $\hat{b}_P$ corresponding to local image activity P of the input pixel vector x from an encoding part or reads the shape vector from a table in the decoding part by a retrieval using the parameter P.

At step 718, boundary noise components are removed from the decoded pixel vector x. Specifically, postprocessed pixel vector $\hat{x}$ without boundary noise component is obtained by subtracting $D\hat{b}_P$ from the decoded pixel vector x as shown in equation (3).

At step 720, it is determined whether the input pixel vector x is the last vector of given images. If not, flow proceeds to step 722 wherein a new decoded vector x is input, and then returns to step 712. If so at step 720, the postprocessing is terminated.

In the above-described postprocessing, the equation (3) is iteratively applied to every 2N-dimensional row or column vectors of every pair of adjacent blocks as shown in FIG. 2. Consequently, each pixel of a block goes through with the equation (3) process four times because each block has four adjacent blocks. However, such computation load in the postprocessing is very low compared to conventional POCS (Projection On Convex Set)-based techniques.

Experimental Results

Figure 8A:
FIG. 8a is a partially enlarged view showing an encoded image or a decoded image without any postprocessing.
Figure 8B:
FIGS. 8b and 8c are partially enlarged views showing decoded images postprocessed with conventional methods.
Figure 8C:
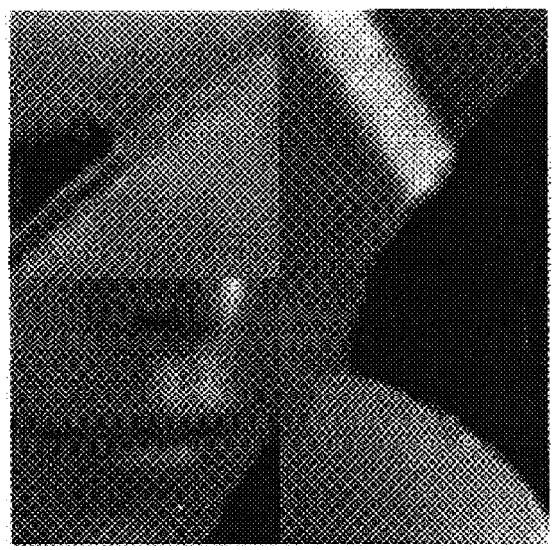
Figure 8D:
FIG. 8d is a partially enlarged view showing a decoded image postprocessed with a method of the present invention.

To calculate the local image activity parameter P for each encoded pixel vector x, N-point DCT is performed for subvectors $x_l$ and $x_r$ as explained above. A boundary noise estimation and postprocessing method described above according to the present invention is applied to a 512×512 image of 'Lenna' (this image is not included in the nine images used in the calculation of equation (7)), and the result is compared with conventional POCS-based postprocessing techniques. FIGS. 8*a* through 8*d* are partially enlarged views of the Lenna image: FIG. 8*a* shows an image decoded without any postprocessing; FIG. 8*b* shows a decoded image postprocessed with Yong et al.' method; FIG. 8*c* shows a decoded image postprocessed with Pack et al.' method; and FIG. 8*d* shows a decoded image postprocessed with the illustrative method of the present invention.

The experimental results show that the present invention significantly improves the image quality, and that the estimated noise components according to the present invention effectively reflect the statistical characteristics of the blocky noise inserted during the encoding process. Although the present invention is applied to still images to obtain the experimental results, this invention may also be applied to postprocessing for moving images.

While the present invention has been described in terms of exemplary embodiments, it is contemplated that it may be practiced as outlined above with modifications within the spirit and scope of the appended claims.

What is claimed is:

1. A method for restoring a block-encoded image, comprising:

estimating block boundary noise components residing across two neighboring blocks in the block-encoded image, wherein the block boundary noise components comprise block boundary discontinuity parameters, which are estimated by subtracting the sum of the average of internal pixel slopes divided by two from a boundary pixel slope;

decoding the block-encoded image to obtain a decoded image; and eliminating the estimated block boundary noise components from the decoded image.

2. The method of claim 1, wherein said block boundary noise components are statistically estimated from encoded pixel vectors of plural images encoded at several bit rates.

3. The method of claim 2, wherein said block boundary noise components are estimated using said block boundary discontinuity parameters and local image activity parameters of the encoded pixel vectors.

4. The method of claim 3, wherein said block boundary discontinuity parameters are slopes of the pixel values across block boundary.

5. The method of claim 3, wherein said local image activity parameters are nonzero coefficient indices of highest frequency in N-point DCT (Discrete Cosine Transform) coefficient vectors of the respective pixel vectors.

6. The method of claim 3, wherein said block boundary noise components are denoted by shape vectors representing shapes of block boundary noises across adjacent blocks.

7. The method of claim 6, wherein said shape vectors are one-dimensional vectors corresponding to pixel rows or columns of the adjacent blocks.

8. The method of claim 6, wherein said shape vectors are estimated with respect to the local image activity parameters.

9. The method of claim 8, wherein said shape vectors are estimated by minimum mean squared error (MMSE) from statistics of the encoded pixel vectors.

10. The method of claim 7, wherein said shape vectors are estimated using original pixel vectors of the block-encoded image, the encoded pixel vectors and the block boundary discontinuity parameters of the encoded pixel vectors.

11. The method of claim 3, wherein said eliminating the estimated block boundary noise components from the decoded image comprises:

calculating the block boundary discontinuity parameters and the local image activity parameters of the encoded pixel vectors;

obtaining shape vectors corresponding to the respective local image activity parameters; and removing products of the block boundary discontinuity parameters and the shape vectors from decoded pixel vectors, respectively.

12. The method of claim 1, further comprising transferring the estimated block boundary noise components to a decoding part prior to said eliminating the estimated block boundary noise components.

13. The method of claim 12, wherein said estimated block boundary noise components are transferred to the decoding part together with encoded pixel vectors in real time.

14. The method of claim 12, wherein said estimated block boundary noise components are previously stored in a table within the decoding part.

15. A method for restoring encoded images, comprising:

sequentially receiving encoded pixel vectors of the encoded images;

calculating local image activities of the encoded pixel vectors, each local image activity corresponding to each encoded pixel vector;

estimating shape vectors representing block boundary noises of the encoded images, the shape vectors varying with the local image activities and each shape vector corresponding to each encoded pixel vector;

sequentially receiving decoded pixel vectors of decoded images;

calculating local image activities of the decoded pixel vectors, each local image activity corresponding to each decoded pixel vector;

obtaining the shape vectors estimated in the step of estimating, each obtained shape vector corresponding to each local image activity; and removing each of the shape vectors obtained in the step of obtaining from corresponding one of the decoded pixel vectors.

16. The method of claim 15, wherein the step of estimating shape vectors includes the steps of:

calculating block boundary discontinuities of the respective encoded pixel vectors;

obtaining boundary noise components of the respective encoded pixel vectors, each boundary noise component being obtained by dividing a difference between each encoded pixel vector and a corresponding original pixel vector by the corresponding block boundary discontinuity; and adding each of the boundary noise components to a previously estimated shape vector.

17. The method of claim 15, wherein the step of removing the shape vectors includes the steps of:

calculating block boundary discontinuities of the respective decoded pixel vectors;

obtaining products of the respective block boundary discontinuities of the respective decoded pixel vectors and the respective shape vectors obtained in the step of obtaining; and subtracting each of the products from corresponding one of the decoded pixel vectors.

18. The method of claim 15, wherein one of the local image activities corresponding to one of the pixel vectors is determined by a largest one of nonzero coefficient indices of the corresponding pixel vector.

19. The method of claim 15, wherein the step of obtaining the shape vectors includes retrieving corresponding shape vectors which are previously stored in a table of a decoding part.

* * * * *